US012304198B2

(12) United States Patent
Miyao et al.

(10) Patent No.: US 12,304,198 B2
(45) Date of Patent: May 20, 2025

(54) IMAGE RECORDING APPARATUS

(71) Applicant: BROTHER KOGYO KABUSHIKI KAISHA, Nagoya (JP)

(72) Inventors: Takahiro Miyao, Nisshin (JP); Yuta Arakawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 74 days.

(21) Appl. No.: 18/339,766

(22) Filed: Jun. 22, 2023

(65) Prior Publication Data

US 2023/0415499 A1 Dec. 28, 2023

(30) Foreign Application Priority Data

Jun. 23, 2022 (JP) ................................ 2022-101008

(51) Int. Cl.

*B41J 11/14* (2006.01)
*B41J 11/00* (2006.01)
*B41J 11/02* (2006.01)
*B41J 11/20* (2006.01)

(52) U.S. Cl.

CPC .............. *B41J 11/14* (2013.01); *B41J 11/006* (2013.01); *B41J 11/007* (2013.01); *B41J 11/02* (2013.01); *B41J 11/20* (2013.01)

(58) Field of Classification Search

CPC ......... B41J 11/14; B41J 11/006; B41J 11/007; B41J 11/02; B41J 11/20

See application file for complete search history.

(56) References Cited

U.S. PATENT DOCUMENTS

| | | | | |
|---|---|---|---|---|
| 11,155,108 | B2 * | 10/2021 | Arakawa | B41J 13/025 |
| 2006/0170751 | A1 * | 8/2006 | Yokoyama | B41J 11/007 347/104 |
| 2007/0035605 | A1 * | 2/2007 | Kitahara | B41J 11/20 347/104 |
| 2013/0083103 | A1 * | 4/2013 | Kakigahara | B41J 11/20 347/9 |
| 2019/0184718 | A1 | 6/2019 | Matsuo | |
| 2020/0122470 | A1 * | 4/2020 | Muromachi | B41J 11/007 |

(Continued)

FOREIGN PATENT DOCUMENTS

| | | | |
|---|---|---|---|
| JP | 2019-107865 | A | 7/2019 |
| JP | 2020-121839 | A | 8/2020 |
| JP | 2021-41585 | A | 3/2021 |

*Primary Examiner* — Henok D Legesse
(74) *Attorney, Agent, or Firm* — Merchant & Gould P. C.

(57) ABSTRACT

An image recording apparatus includes: a housing formed with a first conveying path through which a sheet is conveyed; a head positioned above the first conveying path; a platen positioned below the first conveying path to face the head and which is moved between a first position and a second position farther from the head than the first position; an interference member positioned below the platen; and a discharge tray. The discharge tray is movable between a third position at which the discharge tray is installed in the housing and a fourth position at which the discharge tray is drawn from the housing. The interference member is movable between a fifth position at which the interference member contacts the platen being moved from the first position to the second position and a sixth position at which the interference member does not contact the platen positioned in the second position.

7 Claims, 5 Drawing Sheets

(56) References Cited

U.S. PATENT DOCUMENTS

| | | | |
|---|---|---|---|
| 2020/0239252 A1 | 7/2020 | Komuro | |
| 2021/0070576 A1 | 3/2021 | Arakawa | |
| 2023/0382136 A1 * | 11/2023 | Kosuge | B41J 11/007 |

* cited by examiner

IMAGE RECORDING APPARATUS

REFERENCE TO RELATED APPLICATIONS

This application claims priority from Japanese Patent Application No. 2022-101008 filed on Jun. 23, 2022. The entire content of the priority application is incorporated herein by reference.

BACKGROUND ART

Conventionally, an image recording apparatus configured to record an image on a sheet is known. In the conventional image recording apparatus, when a discharge tray is drawn forward from a housing, a platen is rotated from a print position to an open position. In a state that the platen is in the print position, a recording section records the image on the sheet. In a state that the platen is in the open position, a front end of the platen is located lower than the front end of the platen in the print position.

DESCRIPTION

In the conventional image recording apparatus, a space for the platen to rotate is necessary to be secured. However, parts such as a feeding roller for feeding the sheet held in a feed tray to a conveying path cannot be placed in the space. As a result, the housing becomes large.

An object of the present disclosure is to provide an image recording apparatus capable of resolving sheet jams through an opening formed in a front surface of a housing, while miniaturizing the apparatus.

According to an aspect of the present teaching, there is provided an image recording apparatus, comprising: a housing having a front surface in which an opening is formed, the housing being formed with a first conveying path through which a sheet is conveyed; a head positioned above the first conveying path and configured to eject liquid; a platen positioned below the first conveying path to face the head and configured to be moved between a first position and a second position which is farther from the head than the first position; an interference member positioned below the platen; and a discharge tray configured to be installed in and removed from the housing through the opening, wherein the discharge tray is configured to be moved between a third position at which the discharge tray is installed in the housing and a fourth position at which the discharge tray drawn from the housing is positioned, the interference member is configured to be moved between a fifth position at which the interference member is in contact with the platen being moved from the first position to the second position and a sixth position at which the interference member is out of contact with the platen being positioned at the second position, the interference member is configured to be prevented from being moved to the sixth position by being in contact with the discharge tray being positioned at the third position, and the discharge tray being positioned at the fourth position is out of contact with the interference member being positioned at the sixth position.

Moving the discharge tray to the fourth position where the discharge tray drawn from the housing is positioned allows the interference member to be moved to the sixth position where the interference member is out of contact with the platen being positioned at the second position. Accordingly, even if the interference member is positioned at the fifth position where the interference member is in contact with the platen being moved from the first position to the second position, the platen can be moved to the second position farther from the head than the first position by moving the interference member to the sixth position. Therefore, sheet jams can be resolved easily through the opening in the front surface of the housing, while miniaturizing the image recording apparatus.

The interference member may be held at the fifth position by the discharge tray being positioned at the third position, and the interference member may be configured to be moved from the fifth position to the sixth position in a state of the discharge tray being positioned at the fourth position.

The platen can be moved from the first position to the second position simply by moving the discharge tray from the third position to the fourth position. Therefore, sheet jam clearance can be facilitated.

The interference member may be configured to be moved rearward from the sixth position to the fifth position, the interference member may have a first guide at a rear end thereof, and the first guide may be configured to move the platen from the second position to the first position by a movement of the interference member from the sixth position to the fifth position.

Even if the interference member contacts the platen being positioned at the second position when the interference member is moved from the sixth position to the fifth position, the first guide moves the platen from the second position to the first position. Therefore, the interference member can be moved to the fifth position easily.

The image recording apparatus according to the aspect of the present teaching may further include: a second guide configured to guide the interference member along a front-rear direction; and a lock mechanism configured to hold the interference member at the fifth position.

This makes it easier to move the interference member between the fifth position and the sixth position, and prevents the interference member from being displaced from the fifth position while the sheet is being conveyed.

The second guide may have: a pair of placing parts on which the interference member is placed, the placing parts being spaced apart in a width direction intersecting with a conveyance direction of the sheet; and an abutment part against which the rear end of the interference member being positioned in the fifth position abuts, the abutment part connecting the pair of placing parts in the width direction, an upper surface of the interference member and an upper surface of the abutment part may define a second conveying path through which the sheet with an image recorded on one side thereof is conveyed, and the upper surface of the interference member may be positioned upstream in the second conveying path with respect to the upper surface of the abutment part and may be positioned higher than the upper surface of the abutment part.

This reduces the sheet jams at a position, in the second conveying path, where the interference member contacts the abutment part.

The image recording apparatus according to the aspect of the present teaching may further include a conveying roller positioned in the second conveying path and configured to convey the sheet.

Since the conveying roller can be moved between the fifth position and the sixth position integrally with the second conveying path, the interference member can be moved easily.

The image recording apparatus according to the aspect of the present teaching may further include a feed tray configured to hold the sheet, and the interference member may include a feeding roller configured to feed the sheet held in the feed tray to the first conveying path.

Since the feeding roller can be moved between the fifth position and the sixth position integrally with the second conveying path, the interference member can be moved easily.

According to the present disclosure, it is possible to resolve sheet jams through an opening formed in a front surface of a housing, while miniaturizing the apparatus.

Figure 1:
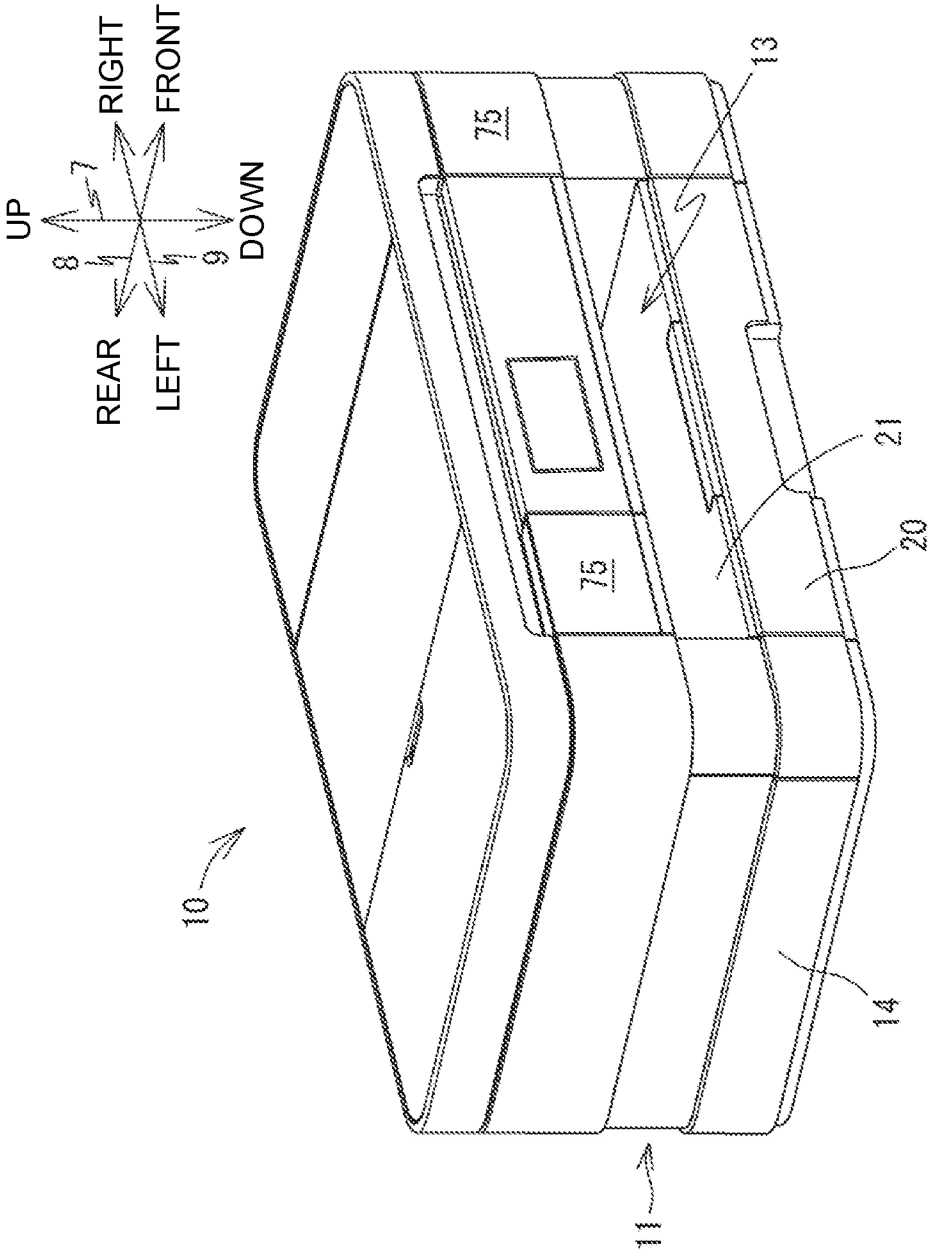
FIG. 1 is a perspective view of a multifunction peripheral according to an embodiment of the present disclosure.

An explanation will be made below, while appropriately referring to the drawings, about an embodiment of the present disclosure. Note that the embodiment explained below is merely an example of the present disclosure. It goes without saying that the embodiment of the present disclosure can be appropriately changed within a range without changing the gist or essential characteristics of the present disclosure. In the following explanation, an up-down direction 7 is defined on the basis of a state (state depicted in FIG. 1) in which a multifunction peripheral 10 is usably installed. A front-rear direction 8 is defined assuming that a side, in which an opening 13 is provided, is defined as a front side (front surface). A left-right direction 9 (an example of a "width direction") is defined as viewing the multifunction peripheral 10 from the front side (front surface).

[Overall Structure of Multifunction Peripheral 10]

As depicted in FIG. 1, the multifunction peripheral 10 (an example of an "image recording apparatus") is generally formed in a thin rectangular parallelepiped, with a printer section 11 at a bottom. The multifunction peripheral 10 has various functions including, for example, a print function, a facsimile function, and a copy function. The multifunction peripheral 10 has a function to record images on both surfaces of a recording paper sheet 12 (see FIG. 2, an example of a "sheet") in accordance with an ink-jet method, as the print function. The multifunction peripheral 10 may be configured to record images on the recording paper sheet 12 by using a method other than the ink-jet method such as an electrophotography method.

As depicted in FIG. 1, the printer section 11 has a housing 14 with an opening 13 in a front surface 75. A first conveying path 65 and a second conveying path 71 (see FIG. 2), which are described below, are formed in the housing 14. The housing 14 is, for example, an exterior cover accommodating each component of the printer section 11 in an interior space thereof

[Feed Tray 20]

Figure 2:
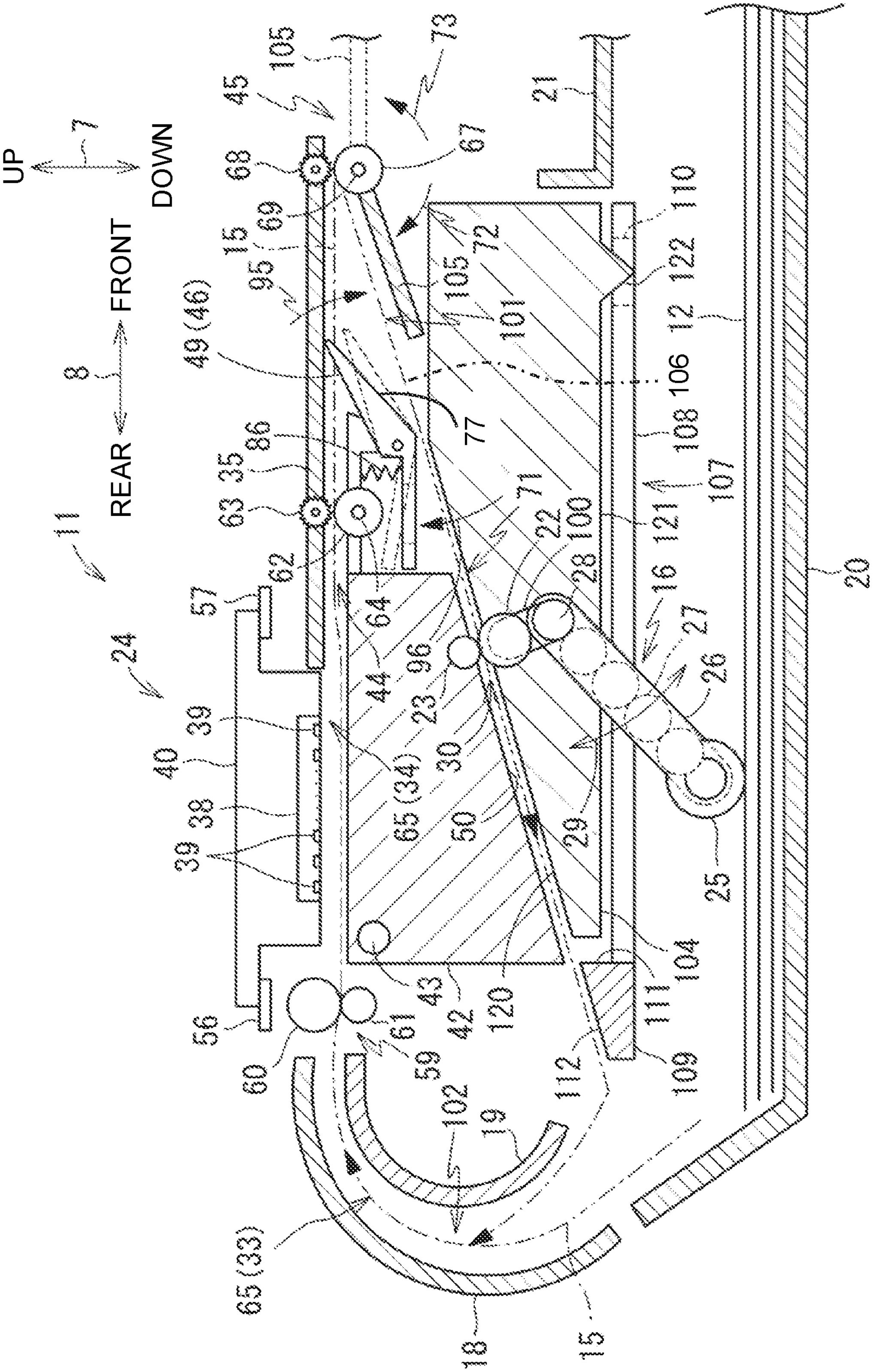
FIG. 2 is a vertical cross-sectional view schematically depicting an internal structure of a printer section.

As depicted in FIG. 1, a feed tray 20 can be inserted into and removed from the housing 14 through the opening 13. As depicted in FIG. 2, the feed tray 20 supports recording paper sheets 12. A discharge tray 21 is supported by the feed tray 20 above the feed tray 20. On an upper surface of the discharge tray 21, the recording paper sheets 12 on which images have been recorded by a recording section 24 (described below) are supported. The discharge tray 21, together with the feed tray 20, can be inserted into and removed from the housing 14 through the opening 13. As depicted in FIG. 1, an install position where the discharge tray 21 is installed in the housing 14 is an example of the third position. A position where the discharge tray 21 is drawn forward from the housing 14 with respect to the install position and completely removed from the housing 14 is an example of the fourth position. The feed tray 20 and discharge tray 21 may not be completely removed from the housing 14, but may be drawn forward from the install position.

[Feeding Section 16]

As depicted in FIG. 2, a feeding section 16 is located above the feed tray 20 in a state of being inserted into housing 14. The feeding section 16 is supported by a release unit 104 (an example of an interference member). The feeding section 16 has a feeding roller 25, a feeding arm 26, a drive transmission mechanism 27, and a support shaft 28. The feeding roller 25 is supported by the feeding arm 26 at a tip portion of the feeding arm 26. The feeding arm 26 can rotate in a direction of arrow 29 around the support shaft 28 provided at a base portion of the feeding arm 26. As a result, the feeding roller 25 can contact and separate from the recording paper sheets 12 supported by the feed tray 20.

The feeding roller 25 is rotated by the drive transmission mechanism 27, which consists of a plurality of gears mesh, transmitting a driving force of a conveyance motor (not depicted). As a result, among the recording paper sheets 12 supported in the feed tray 20, an uppermost recording paper sheet 12 in contact with the feeding roller 25 is fed to the first conveying path 65. The feeding roller 25 may rotate by a driving force of a motor provided separately from the conveyance motor.

[First Conveying Path 65]

As depicted in FIG. 2, inside the housing 14, the first conveying path 65 extends from a rear end of the feed tray 20. The first conveying path 65 has a curved section 33 and a straight section 34. The curved section 33 extends upward from the rear end of the feed tray 20 while curving, and is connected to the straight section 34 behind a conveying roller pair 59 described below. The straight section 34 extends in the front-rear direction 8 from a connection position with the curved section 33 to a reverse roller pair 45 described below.

The curved section 33 is defined by an outer guide member 18 and an inner guide member 19 facing each other with a predetermined distance therebetween. The straight section 34 is defined by the recording section 24 and a platen 42 facing each other with a predetermined distance therebetween at a location of the recording section 24. The straight section 34 is defined behind the recording section 24 by a conveying roller 60 and a pinch roller 61 facing each other. In front of the recording section 24, the straight section 34 is defined by a first upper guide member 35 and the platen 42 facing each other with a predetermined distance therebetween, by a discharge roller 62 and a spur roller 63 facing each other, by the first upper guide member 35 and a flap 49 facing each other, and by the reverse roller 67 and a spur roller 68 facing each other.

Each of the recording paper sheets 12 supported on the feeding tray 20 is fed by the feeding roller 25 to the curved section 33, and is conveyed from the curved section 33 to the straight section 34 along a conveyance direction 15 depicted by an arrow of one dot chain line in FIG. 2.

[Recording Section 24]

As depicted in FIG. 2, the recording section 24 is located above the straight section 34. The platen 42 supporting the recording sheet 12 on the first conveying path 65 is located below the straight section 34 to face the recording section 24 and the first upper guide member 35.

The recording section 24 includes a carriage 40 and a recording head 38. The carriage 40 is supported by two guide rails 56, 57 spaced apart in the front-rear direction 8, such that the carriage 40 can reciprocate along the left-right direction 9. The guide rails 56, 57 are supported at their left and right ends by a pair of side frames 53. The pair of side frames 53 is positioned to the right and to the left of the straight section 34.

The recording head 38 is mounted on the carriage 40. Ink (an example of liquid) is supplied to the recording head 38 from an ink cartridge (not depicted). Nozzles 39 are formed on a lower surface of the recording head 38. When the carriage 40 is moving in the left-right direction 9, the recording head 38 ejects ink droplets from the nozzles 39 toward the platen 42. As a result, an image is recorded on the recording paper sheet 12, which is conveyed in the conveyance direction 15 through the straight section 34 and supported by the platen 42.

Figure 4:
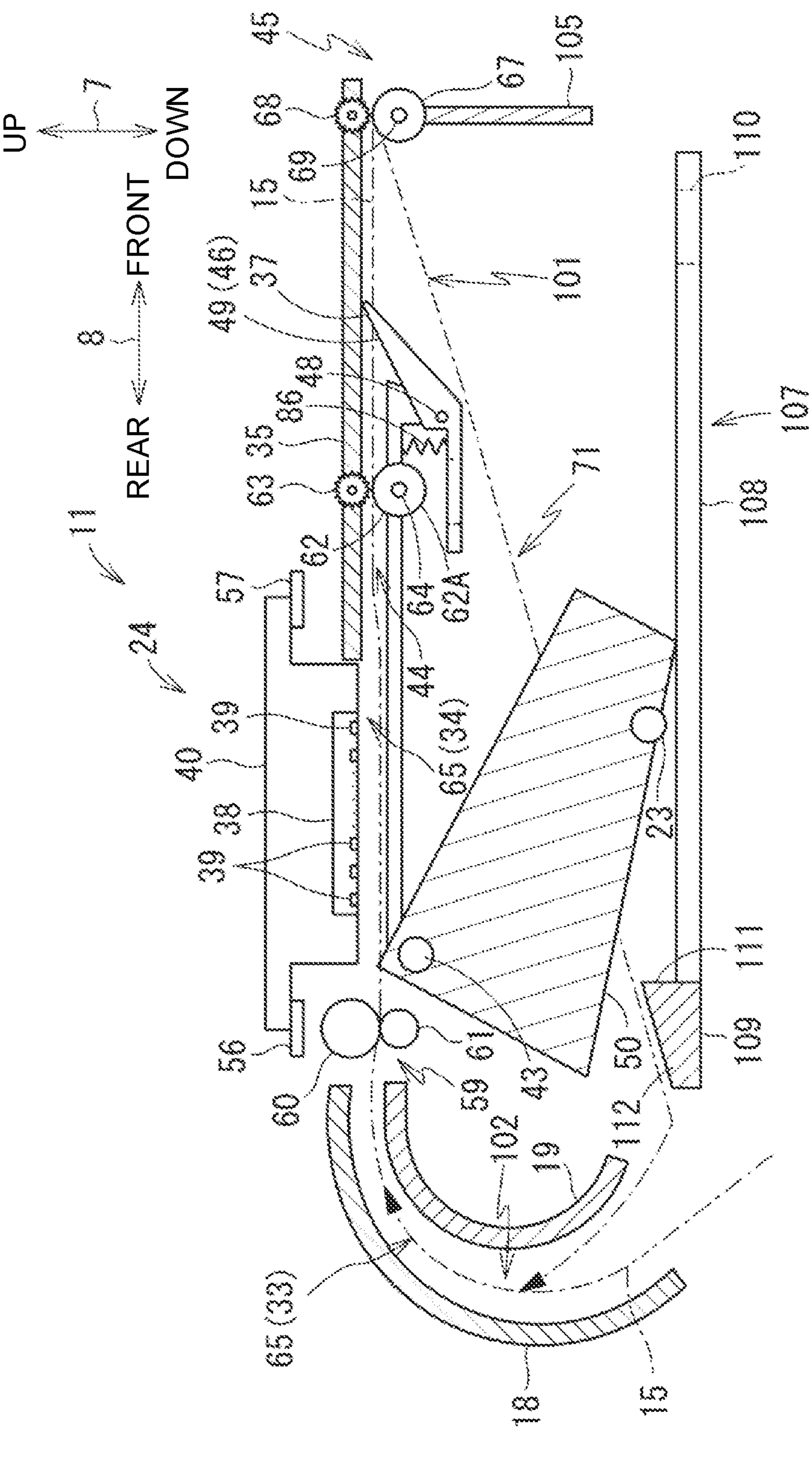
FIG. 4 is a vertical cross-sectional view of the printer section with a release unit removed from the housing.

The platen 42 has a rotation axis 43 extending along the left-right direction 9 on a rear side thereof. The rotation axis 43 is supported by a frame or the like located in the housing 14. The platen 42 is rotatable around the rotation axis 43. As depicted in FIG. 2, the platen 42 is held in a recording position (an example of a first position) by being supported from below by the release unit 104. As depicted in FIG. 4, when the release unit 104 is pulled out of the housing 14, the platen 42 is rotated by its own weight and a front side of the platen 42 moves downward. As a result, the platen 42 is moved to a release position (an example of a second position). An upper surface of the platen 42 in the release position is farther downward from the recording head 38 than the upper surface of the platen 42 in the recording position.

[Conveying Roller Pair 59, Discharge Roller Pair 44, and Reverse Roller Pair 45]

As depicted in FIG. 2, in the straight section 34, a conveying roller pair 59 is located upstream in the conveyance direction 15 from the recording section 24. In the straight section 34, a discharge roller pair 44 is located downstream in the conveyance direction 15 from the recording unit 24. A reverse roller pair 45 is disposed downstream in the conveyance direction 15 from the discharge roller pair 44, in the straight section 34.

The conveying roller pair 59 has the conveying roller 60 disposed on an upper side of the straight section 34 and the pinch roller 61 disposed on a lower side of the straight section 34 to face the conveying roller 60. The discharge roller pair 44 has the discharge roller 62 disposed on the lower side of the straight section 34 and the spur roller 63 disposed on the upper side of the straight section 34 to face the discharge roller 62. The reverse roller pair 45 has the reverse roller 67 located on the lower side of the straight section 34 and the spur roller 68 located on the upper side of the straight section 34 to face the reverse roller 67.

The pinch roller 61 is urged toward the conveying roller 60 by a first coil spring, the discharge roller 62 is urged toward the spur roller 63 by a second coil spring, and the reverse roller 67 is urged toward the spur roller 68 by a third coil spring. As a result, each of the roller pairs 59, 44, 45 can hold the recording paper sheet 12 on the first conveying path 65.

The discharge roller 62 and the reverse roller 67, which are located on a lower side of the roller pairs 44, 45, are rotatably supported by a frame not depicted in the drawings.

The conveying roller 60, the discharge roller 62, and the reverse roller 67 rotate forward when forward driving force of a motor (not depicted) is transmitted and rotate in reverse when reverse driving force is transmitted. The pinch roller 61 is rotated with the rotation of the conveying roller 60. The spur roller 63 is rotated with the rotation of the discharge roller 62. The spur roller 68 is rotated with the rotation of the reverse roller 67.

When each of the rollers 60, 62, 67 rotates forward while the recording paper sheet 12 is nipped by each of the roller pairs 59, 44, 45, the recording paper sheet 12 is conveyed in the conveyance direction 15. On the other hand, when each of the rollers 60, 62, 67 rotates in reverse, the recording paper sheet 12 is conveyed in an opposite direction of the conveyance direction 15.

[Second Conveying Path 71]

As depicted in FIG. 2, the second conveying path 71 passes below the straight section 34 and above the feeding roller 25. In other words, the second conveying path 71 is provided on an opposite side of the straight section 34 to the discharge roller 62. The second conveying path 71 is a path that branches off from the straight section 34 at a branching position 101, which is downstream in the conveyance direction 15 from the discharge roller pair 44 and upstream in the conveyance direction 15 from the reverse roller pair 45. In detail, the second conveying path 71 branches from the straight section 34 on a side of the platen 42 in the up-down direction 7, which is a facing direction of the first upper guide member 35 and the platen 42. The second conveying path 71 is a path that merges with the curved section 33 at a merging position 102 upstream in the conveyance direction 15 from the conveying roller pair 59.

The second conveying path 71 is defined by the flap 49 and a guide member 105 facing each other with a predetermined distance, a lower surface 50 of the platen 42, an upper surface 120 of the release unit 104 (an example of an interference member), and an upper surface 112 of an abutment part 109.

The flap 49 and the lower surface 50 of the platen 42 define an upper side of the second conveying path 71. The upper surface 120 of the release unit 104 and the upper surface 112 of the abutment part 109 define a lower side of the second conveying path 71. The flap 49 is positioned upstream in an inverted conveyance direction 106 from the second upper guide member 103. Here, the inverted conveyance direction 106 is a direction from the branching position 101 to the merging position 102 in the second conveying path 71. The upper surface 120 of the release unit 104 is located upstream in the inverted conveyance direction 106 from the upper surface 112 of the abutment part 109 and above the upper surface 112 of the abutment part 109.

[Reconveying Roller Pair 30]

As depicted in FIG. 2, a reconveying roller pair 30 is located in the second conveying path 71. The reconveying roller pair 30 has a reconveying roller 22 (an example of a conveying roller) located on the lower side of the second conveying path 71 and a driven roller 23 located on the upper side of the second conveying path 71 to face the reconveying roller 22. The reconveying roller 22 is rotatably supported at a tip end of a reconveying arm 100 and is driven by a motor. The reconveying arm 22 is supported by the release unit 104. The driven roller 23 is supported by the platen 42 and exposed from the lower surface 50 of the platen 42, and is rotated with rotation of the reconveying roller 22. The reconveying roller 22 rotates forward regardless of whether drive power in forward rotation or in reverse rotation of the motor is transmitted. When the reconveying roller 22 rotates forward in a state of the recording paper sheet 12 is nipped by the reconveying roller pair 30, the recording paper sheet 12 is conveyed in the inverted conveyance direction 106.

[Flap 49]

As depicted in FIG. 2, the flap 49 is located between the discharge roller pair 44 and the reverse roller pair 45 in the straight section 34. More specifically, the flap 49 is located at the branching position 101. The flap 49 is located on the lower side of the first conveying path 65 to face the first upper guide member 35 in the up-down direction 7.

The flap 49 is configured to be rotatable between at least a first state and a second state. The first state (depicted by a solid line in FIG. 2) is a state in which the first conveying path 65 is closed by the flap 49 contacting the first upper guide member 35. The second state (depicted by a dashed line in FIG. 2) is a state in which the flap 49 is separated from the first upper guide member 35 to allow the recording paper sheet 12 conveyed in the conveyance direction 15 in the straight section 34 to pass through the flap 49. A rotation tip of the flap 49 in the second state is located lower than the rotation tip of the flap 49 in the first state.

The flap 49 is urged upward by a coil spring 86. One end of the coil spring 86 is connected to the flap 49. The other end of the coil spring 86 is connected to the platen 42. As the flap 49 is urged by the coil spring 86, a front end portion 37 of a plate member 46 abuts against the first upper guide member 35. A lower surface 79 of the flap 49 partly defines the upper side of the second conveying path 71.

[Guide Member 105]

As depicted in FIG. 2, the guide member 105 faces a guide part 77 of the flap 49 thereby partly defining the lower side of the second conveying path 71.

The guide member 105 is rotatably supported by a shaft 69 of the reverse roller 67. In detail, an upstream end portion in the inverted conveyance direction 106 of the guide member 105 is supported by the shaft 69. The guide member 105 is rotatable in the direction of arrows 72 and 73. The arrow 72 indicates a direction in which the guide member 105 approaches flap 49. The arrow 73 indicates a direction in which guide member 105 moves away from flap 49.

The guide member 105 can be rotated between a guide position depicted by a solid line in FIG. 2 and a release position depicted by a dashed line in FIG. 2. The guide member 105 is held in the guide position by being supported from below by the release unit 104.

The guide member 105 in the guide position faces the guide part 77 of the flap 49 and partly defines the lower side of the second conveying path 71. The guide member 105 in the guide position guides the recording paper sheet 12 being conveyed in the second conveying path 71. As depicted in FIG. 2, when the guide member 105 is in the release position, the guide member 105 is exposed to the outside of the multifunction peripheral 10 through the opening 13. In other words, when the guide member 105 is in the release position, the second conveying path 71 is open.

[Release Unit 104]

As depicted in FIG. 2, the release unit 104 is located between the platen 42 and the feed tray 20 in the up-down direction 7. The release unit 104 is box-shaped, is supported from below by a guide frame 107 (an example of a second guide), and is movable along the front-rear direction 8.

Figure 3:
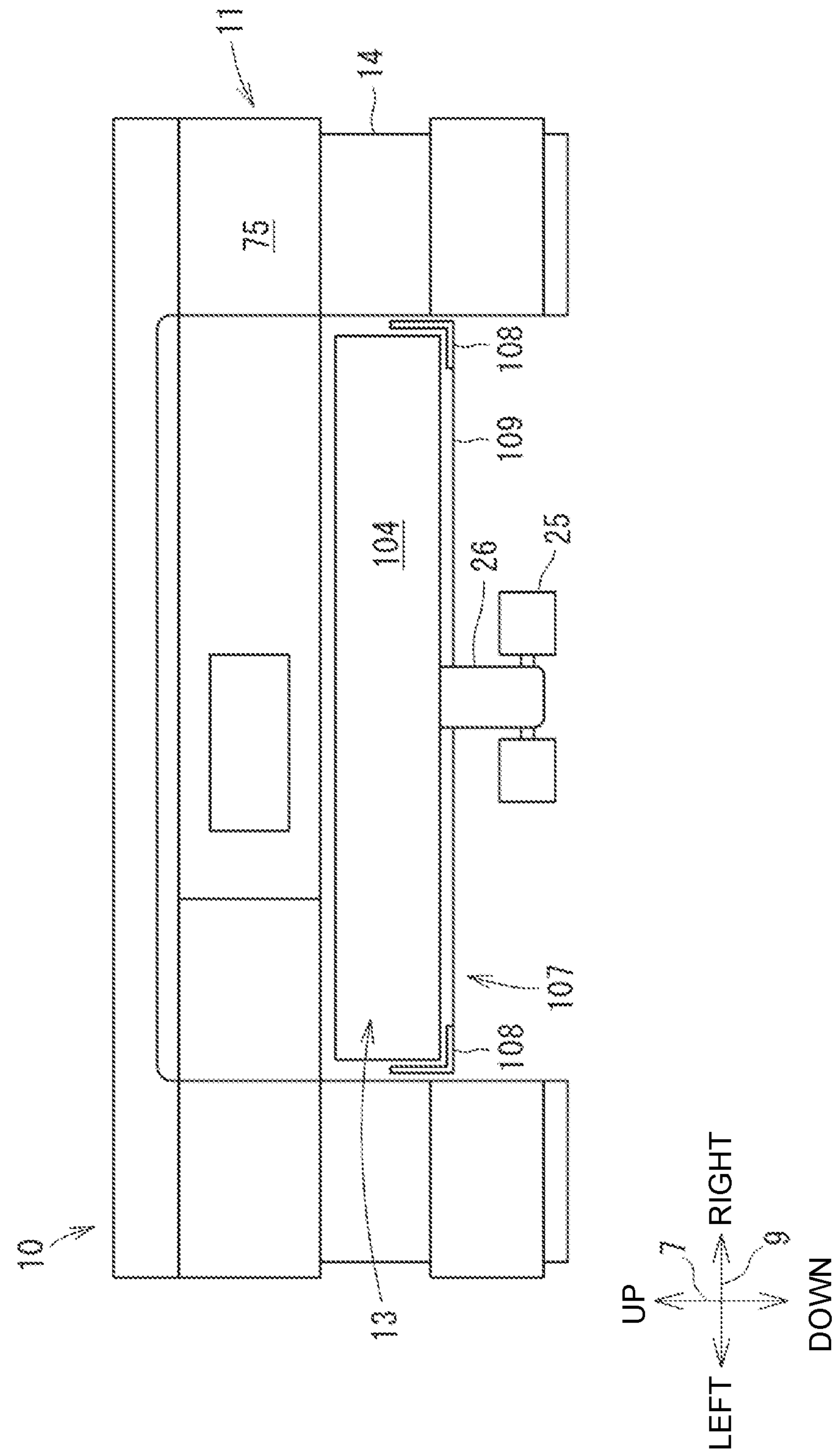
FIG. 3 is a front view of the multifunction peripheral with a feed tray and a discharge tray removed from a housing.

As depicted in FIG. 3, the guide frame 107 has a pair of placing parts 108 spaced apart in the left-right direction 9 behind the opening 13 of the housing 14. The guide frames 107 may, for example, be integrally formed with a frame supporting each roller. The guide frame 107 has the pair of flat-plate shaped placing parts 108 and the abutment part 109. Each of the placing parts 108 extends in the front-rear direction 8 and left-right direction 9. The abutment part 109 connects the pair of placing parts 108 in the left-right direction 9 and is located behind the release unit 104.

The placing parts 108 are located outside in the left-right direction 9 of an area where the recording paper sheet 12 is conveyed through the second conveying path 71, respectively. The placing parts 108 support both ends in the left-right direction 9 of a lower surface 121 of the release unit 104 from below. Each of the placing parts 108 extends from near the rear end of the platen 42 to near the reverse roller pair 45 in the front-rear direction 8. The release unit 104 can slide on the pair of placing parts 108 and move in the front-rear direction 8.

A through hole 110 is formed in one of the placing parts 108 (the placing part 108 located on the right side in this embodiment). An engagement claw 122 protruding downwardly from the lower surface 121 of the release unit 104 can enter the through hole 110. The entry of the engagement claw 122 into the through hole 110 holds the release unit 104 in a support position (an example of a fifth position). The engagement claw 122 is deformable to be immersed into the lower surface 121. When the engagement claw 122 deforms and is immersed into the lower surface 121, the release unit 104 can move forward from the support position. The through hole 110 and the engagement claw 122 are an example of a lock mechanism.

As depicted in FIG. 2, the abutment part 109 is located at the rear end of the pair of placing parts 108. The abutment part 109 protrudes above an upper surface of each of the placing parts 108. A front surface 111 of the abutment part 109 facing forward abuts against the rear end of the release unit 104 supported by the placing parts 108, thereby positioning the release unit 104 in the support position. The upper surface 112 of the abutment part 109 defines a rear portion of the second conveying path 71.

The release unit 104 supports the feeding section 16 and the reconveying roller 22. The feeding section 16 and the reconveying roller 22 can move with the release unit 104 in the front-rear direction 8. The feeding section 16 extends downward from between the pair of placing parts 108. The release unit 104 is box-shaped with dimensions slightly larger in the left-right direction 9 than the conveying area of the recording paper sheet 12 in the second conveying path 71. The upper surface 120 of the release unit 104 (an example of a first guide) is an inclined surface that slopes downward toward the rear, and partly defines the second conveying path 71. In the release unit 104 of the support position, the upper surface 120 is located upstream in the inverted conveyance direction 106 from the upper surface 112 of the abutment part 109 and above the upper surface 112 of the abutment part 109.

The release unit 104 in the support position supports the platen 42 from below and holds the platen 42 in the recording position. The release unit 104 in the support position also supports the guide member 105 from below and holds the guide member 105 in a position defining the second conveying path 71. The discharge tray 21 in the install position is located in front of the release unit 104 in the support position. The release unit 104 and the discharge tray 21 overlap in position in the up-down direction 7. When the release unit 104 in the support position is moved forward, the release unit 104 abuts against the discharge tray

21 in the install position. The abutment against the discharge tray 21 prevents the release unit 104 from being moved forward from the support position. When the discharge tray 21 is moved forward from the install position and removed from the housing 14, the discharge tray 21 is in out of contact with the release unit 104, and the release unit 104 can move forward from the support position.

[Double-Sided Image Recording]

A double-sided image recording is a process in which images are recorded on both of a first side and a second side opposite the first side of the recording paper sheet 12.

When the double-sided image recording is indicated, the feeding roller 25 is rotated to feed recording paper sheet 12 from the feed tray 20 to the first conveying path 65. The recording paper sheet 12 passed through the curved section 33 of the first conveying path 65 is conveyed in the conveyance direction 15 through the straight section 34 while being nipped by the conveying roller pair 59. The ink is ejected from the recording head 38 onto the first side (upper surface) of the recording paper sheet 12 supported by the platen 42 to record an image on the first side of the recording paper sheet 12. The recording paper sheet 12, which has been conveyed in the conveyance direction 15 with the image being recorded, is nipped by the discharge roller pair 44 and conveyed in the conveyance direction 15 through the straight section 34, and abuts against the flap 49. By coming into contact with the recording paper sheet 12, the flap 49 is pushed down against the urging force of the coil spring 86. As a result, the flap 49 is rotated to the second state.

The recording paper sheet 12 passed through the flap 49 is nipped by the reverse roller pair 45 and conveyed in the conveyance direction 15. When a rear end of the recording paper sheet 12 passes through the flap 49, the flap 49 rotates from the second state to the first state by being urged by the coil spring 86.

When the reverse roller 67 is then switched from the forward rotation to the reverse rotation, the reverse roller pair 45 conveys the recording paper sheet 12 in an opposite direction of the conveyance direction 15. The recording paper sheet 12 conveyed in the opposite direction of the conveyance direction 15 enters into the second conveying path 71 guided by the flap 49 in the first state.

The recording paper sheet 12 entered into the second conveying path 71 is further conveyed by the reconveying roller pair 30 in the inverted conveyance direction 106. The recording paper sheet 12 conveyed through the second conveying path 71 in the inverted conveyance direction 106 is conveyed again through the curved section 33 in the conveyance direction 15 via the merging position 102. The recording paper sheet 12 then reaches the conveying roller pair 59. Here, when each of the rollers 60, 62, 67 is switched from the reverse rotation to the forward rotation with the reconveying roller 22 being maintained in the forward rotation, the recording paper sheet 12 is conveyed by the conveying roller pair 59 in the conveyance direction 15 and reaches below the recording section 24. At this time, the second side of the recording paper sheet 12 faces the recording head 38. The recording head 38 ejects the ink onto the second side of the recording paper sheet 12 to record an image. The recording paper sheet 12 with the images recorded on both sides is then conveyed by the discharge roller pair 44 and the reverse roller pair 45 in the conveyance direction 15 and discharged to the discharge tray 21. In a case that the image is recorded on only the first side of the recording paper sheet 12, the reverse roller 67 is not switched to the reverse rotation and continues to rotate forward. As a result, the reverse roller pair 45 conveys the recording paper sheet 12 in the conveyance direction 15 and discharges the recording paper sheet 12 to the discharge tray 21.

[Removal of Release Unit 104]

In the multifunction peripheral 10, the release unit 104 is removed when the recording paper sheet 12 is jammed on the platen 42 of the straight section 34 of the first conveying path 65 or at the branching position 101.

The feed tray 20 and the discharge tray 21 in the install position are pulled forward from the housing 14 and removed from the housing 14 by an operation of a user. This exposes the release unit 104 to the front of the housing 14 through the opening 13 of the housing 14, as depicted in FIG. 3. The removal of the discharge tray 21 from the housing 14 allows the release unit 104 in the support position to move forward without abutting against the discharge tray 21.

The release unit 104 in the support position is pulled forward along the placing parts 108 of the guide frame 107 and removed from the housing 14, while the engagement claw 122 is being deformed to be out of the through hole 110 of the guide frame 107. Together with the release unit 104, the feeding section 16 and the reconveying roller 22 are also removed from the housing 14. As depicted in FIG. 4, the platen 42 moves from the recording position to the release position with the front end side being rotated downward (clockwise in FIG. 4) around the rotation axis 43 due to its own weight. By moving the platen 42 to the release position, the space below the recording head 38 in the straight section 34 of the first conveying path 65 is opened and is accessible to the user from outside through the opening 13 of the housing 14.

The guide member 105 in the guide position is moved to the release position with the rear end thereof being rotated downward around the axis 69 by its own weight (counterclockwise in FIG. 4). As a result, the space around the branching position 101 of the first conveying path 65 and the second conveying path 71 is opened and accessible to the user from the outside through the opening 13 of the housing 14.

Figure 5:
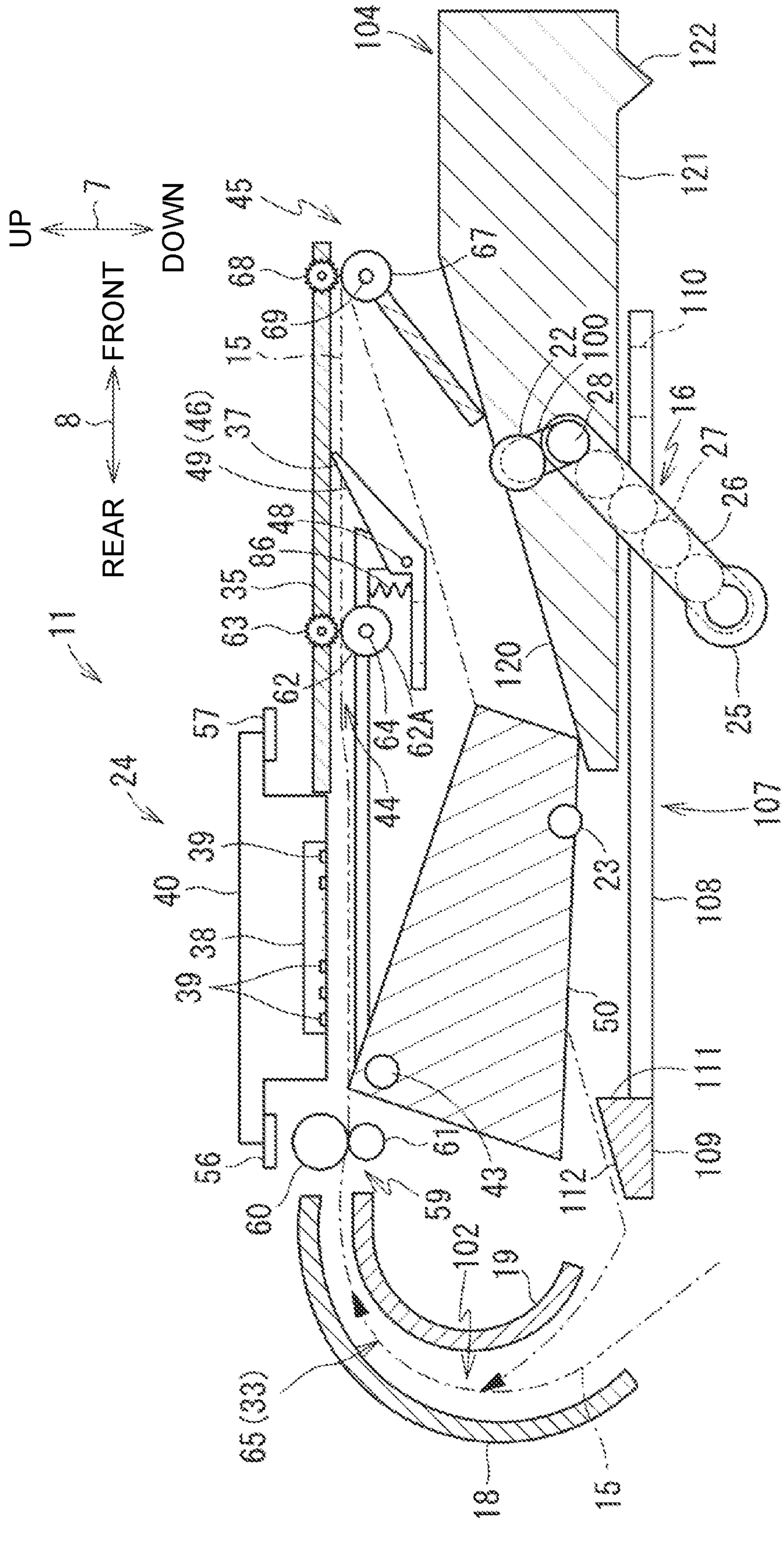
FIG. 5 is a vertical cross-sectional view of the printer section in a process of inserting the release unit into the housing.

When the paper sheet jam or other problem is resolved, the release unit 104, the feed tray 20, and the discharge tray 21 are installed in the housing 14 by the reverse operation described above. As depicted in FIG. 5, when the release unit 104 is inserted rearward along the placing parts 108 of the guide frame 107, the upper surface 120 of the release unit 104 abuts against the guide member 105 from below. As the release unit 104 is moved rearward, the rear end of the guide member 105 is rotated to move upward (clockwise in FIG. 5). In other words, the guide member 105 in the release position is moved toward the guide position.

When the release unit 104 is inserted rearward, the upper surface 120 of the release unit 104 abuts against the platen 42 from below. As the release unit 104 is moved rearward, the front end of the platen 42 is rotated to move upward (clockwise in FIG. 5). In other words, the platen 42 in the release position is moved toward the recording position.

The release unit 104, which is moved rearward along the placing parts 108 of the guide frame 107, reaches the support position by abutting against the abutment part 109. In the support position, the engagement claw 122 of the release unit 104 enters into the through hole 110 of the guide frame 107. The release unit 104 in the support position holds the platen 42 in the recording position. The release unit 104 in the support position also holds the guide member 105 in the guide position.

After the release unit 104 is installed in the housing 14, the feed tray 20 and the discharge tray 21 are inserted rearward through the opening 13 of the housing 14. As depicted in FIG. 2, in a state that the feed tray 20 and the discharge tray 21 reach the install position, the discharge tray 21 is positioned in front of the release unit 104.

Effects of Embodiment

According to the embodiment, by drawing the discharge tray 21 out of the housing 14, the forward movement restriction of the release unit 104 in the support position is removed. When the release unit 104 in the support position is moved forward and removed from the housing 14, the platen 42 in the recording position moves to the release position and away from the recording head 38. This allows the jam to be easily cleared through the opening 13 of housing 14 while miniaturizing the multifunction peripheral 10.

When the release unit 104 is inserted into housing 14, the release unit 104 can move the platen 42 to the recording position by abutting against the platen 42 in the release position.

The lock mechanism configured with the through hole 110 in the guide frame 107 and the engagement claw 122 facilitates movement of the release unit 104 in the front-rear direction 8 and also prevents the release unit 104 from shifting from the support position during the image recording.

The upper surface 120 of the release unit 104 is located upstream in the inverted conveyance direction 106 in the second conveying path 71 from the upper surface 112 of the abutment part 109 and above the upper surface 112 of the abutment part 109. Therefore, the jams are prevented from occurring at the location where the release unit 104 and the abutment part 109 abut in the second conveying path 71.

In addition, since the reconveying roller 22 moves integrally with the release unit 104, the moving operation of the release unit 104 becomes easier.

In addition, since the feeding section 16 moves integrally with the release unit 104, the moving operation of the release unit 104 becomes easier.

[Modifications]

In the aforementioned embodiment, the discharge tray 21 and the release unit 104 were removed from the housing 14 independently, but the discharge tray 21 and the release unit 104 may be linked together and may be removed from the housing 14 integrally. In other words, the release unit 104 is held in the support position by the discharge tray 21 in the install position, and when the discharge tray 21 is moved forward from the install position and removed from the housing 14, the release unit 104 in the support position may also be moved forward in conjunction with the forward movement of the discharge tray 21 and removed from the housing 14. This further facilitates the jam clearance.

Although the release unit 104 supports the feeding section 16 and the reconveying roller 22 in the aforementioned embodiment, the release unit 104 may be configured to be removable from the housing 14 independently of the feeding section 16 and the reconveying roller 22, without supporting the feeding section 16 and the reconveying roller 22.

What is claimed is:

1. An image recording apparatus, comprising:

a housing having a front surface in which an opening is formed, the housing being formed with a first conveying path through which a sheet is conveyed;

a head positioned above the first conveying path and configured to eject liquid;

a platen positioned below the first conveying path to face the head and configured to be moved between a first position and a second position which is farther from the head than the first position;

an interference member positioned below the platen; and a discharge tray configured to be installed in and removed from the housing through the opening, wherein the discharge tray is configured to be moved between a third position at which the discharge tray is installed in the housing and a fourth position at which the discharge tray drawn from the housing is positioned, the interference member is configured to be moved between a fifth position at which the interference member is in contact with the platen being moved from the first position to the second position and a sixth position at which the interference member is out of contact with the platen being positioned at the second position, the interference member is configured to be prevented from being moved to the sixth position by being in contact with the discharge tray being positioned at the third position, and the discharge tray being positioned at the fourth position is out of contact with the interference member being positioned at the sixth position.

2. The image recording apparatus according to claim 1, wherein the interference member is held at the fifth position by the discharge tray being positioned at the third position, and the interference member is configured to be moved from the fifth position to the sixth position in a state of the discharge tray being positioned at the fourth position.

3. The image recording apparatus according to claim 2, wherein the interference member is configured to be moved rearward from the sixth position to the fifth position, the interference member has a first guide, and the first guide is configured to move the platen from the second position to the first position by a movement of the interference member from the sixth position to the fifth position.

4. The image recording apparatus according to claim 3, further comprising:

a second guide configured to guide the interference member along a front-rear direction; and a lock mechanism configured to hold the interference member at the fifth position.

5. The image recording apparatus according to claim 4, wherein the second guide has:

a pair of placing parts on which the interference member is placed, the placing parts being spaced apart in a width direction intersecting with a conveyance direction of the sheet; and an abutment part against which a rear end of the interference member being positioned in the fifth position abuts, the abutment part connecting the pair of placing parts in the width direction, an upper surface of the interference member and an upper surface of the abutment part define a second conveying path through which the sheet with an image recorded on one side thereof is conveyed, and the upper surface of the interference member is positioned upstream in the second conveying path with respect to the upper surface of the abutment part and is positioned higher than the upper surface of the abutment part.

6. The image recording apparatus according to claim 5, further comprising a conveying roller positioned in the second conveying path and configured to convey the sheet.

7. The image recording apparatus according to claim 5, further comprising a feed tray configured to hold the sheet, wherein the interference member includes a feeding roller configured to feed the sheet held in the feed tray to the first conveying path.

* * * * *